United States Patent
Yoshida et al.

(10) Patent No.: US 8,019,031 B2
(45) Date of Patent: Sep. 13, 2011

(54) USER SELECTION METHOD AND USER SELECTION DEVICE FOR MULTIUSER MIMO COMMUNICATION

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 689 days.

(21) Appl. No.: 12/166,922

(22) Filed: Jul. 2, 2008

(65) Prior Publication Data

US 2009/0010369 A1 Jan. 8, 2009

(30) Foreign Application Priority Data

Jul. 2, 2007 (JP) ................................ 2007-174110

(51) Int. Cl.
*H04B 1/10* (2006.01)
(52) U.S. Cl. ........ 375/349; 375/260; 370/239; 370/335; 370/338; 455/132; 455/185.1; 455/226.3; 455/272; 455/522
(58) Field of Classification Search .................. 375/260, 375/349; 455/226.3, 522; 370/280, 329, 370/335, 338
See application file for complete search history.

(56) References Cited

U.S. PATENT DOCUMENTS

2009/0004986 A1* 1/2009 Park et al. .................. 455/226.3

FOREIGN PATENT DOCUMENTS

| JP | 2003-510863 | 3/2003 |
|---|---|---|
| JP | 2004-072566 | 3/2004 |
| JP | 2004-236092 | 8/2004 |
| JP | 2004-529527 | 9/2004 |
| JP | 2005-006287 | 1/2005 |
| JP | 2005-252602 | 9/2005 |
| JP | 2006-005908 | 1/2006 |
| JP | 2006-504372 | 2/2006 |
| JP | 2006-086633 | 3/2006 |
| JP | 2006-222742 | 8/2006 |
| JP | 2006-261982 | 9/2006 |
| JP | 2006-270430 | 10/2006 |
| JP | 2006-303691 | 11/2006 |
| JP | 2006-340265 | 12/2006 |
| WO | WO 01/20789 A1 | 3/2001 |
| WO | WO 02/058300 A1 | 7/2002 |
| WO | WO 2004/038986 A3 | 5/2004 |

OTHER PUBLICATIONS

Zhenyu Tu, et al., "Multiuser Diversity for a Dirty Paper Approach.", IEEE Communications Letters, vol. 7, No. 8, Aug. 2003, pp. 370-372.

* cited by examiner

*Primary Examiner* — Nick Corsaro
*Assistant Examiner* — Fitwi Hailegiorgis
(74) *Attorney, Agent, or Firm* — Scully, Scott, Murphy, Presser, P.C.

(57) ABSTRACT

The present invention aims to provide a user selection method which can provide a large, multiuser diversity effect with a small amount of calculation in multiuser MIMO systems, the method being a user selection method for multiuser MIMO communication, in which an orthogonal coefficient is calculated using a received SINR from a projection channel vector by using GS orthogonalization, and using the orthogonal coefficient, a correction SINR is calculated, and using this correction SINR, user selection is performed, and for a next user selection, the projection channel vector is updated, and the above processes are applied to all users.

28 Claims, 11 Drawing Sheets

USER SELECTION METHOD AND USER SELECTION DEVICE FOR MULTIUSER MIMO COMMUNICATION

This application is based upon and claims the benefit of priority from Japanese patent application No. 2007-174110, filed on Jul. 2, 2007, the disclosure of which is incorporated herein in its entirety by reference.

BACKGROUND OF THE INVENTION

1. Field of the Invention

The present invention relates to a user selection method for multiuser MIMO communication.

2. Description of the Related Art

In up-link wireless access of Next Generation Mobile Communication Systems, to improve cell throughput, multiuser Multiple Input Multiple Output (MIMO) communication (hereinafter, called "MU-MIMO") may be expected to be used. In MU-MIMO, multiple terminals transmit data signals at the same frequency and a base station separates transmitted signals of multiple users which are viewed as MIMO signals. MU-MIMO may be viewed as a Space Division Multiple Access (SDMA) system in which a space channel forms a resource in addition to traditional resources of time and frequency, and a large, multiuser diversity effect can be provided by suitably selecting a pair of users performing simultaneous, multiple access.

Figure 1:
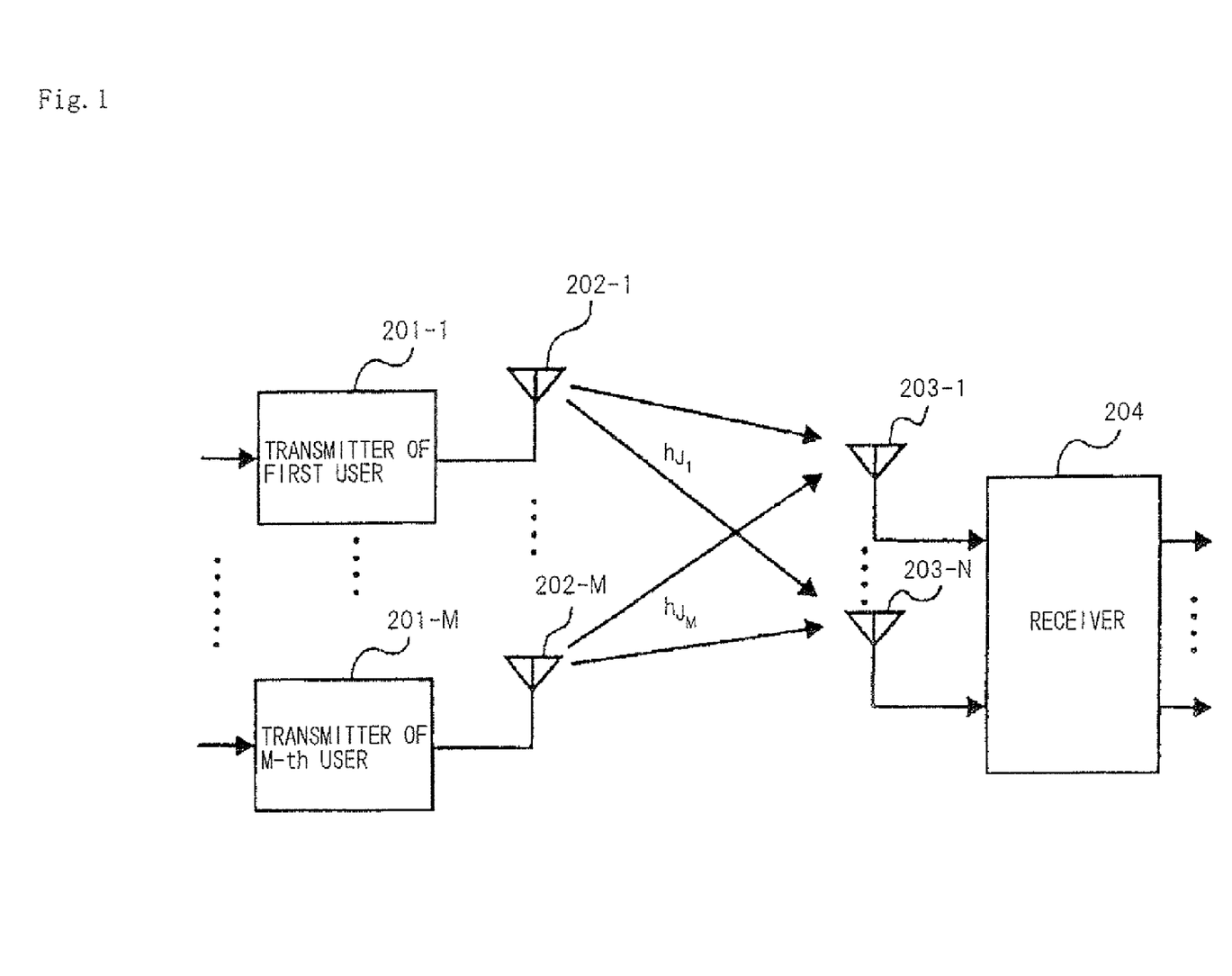
FIG. 1 shows an up-line portion in a multiuser MIMO system.

FIG. 1 shows a configuration of an up-line portion in an MU-MIMO system. Here, each transmitter is supposed to have one transmission antenna, but it may be thought that each transmitter has multiple transmission antennas, and selects one for transmission, or transmits from the multiple transmission antennas.

Taking the number of simultaneous transmission users as M, user transmitters 201-1 to 201-M convert a data signal into an error-correcting code and perform digital modulation, respectively. Transmission antennas 202-1 to 202-M transmit a data signal of each user, respectively. Receiving antennas 203-1 to 203-M receive multiplexed data signal of each user. Receiver 203 separates the data signal of each user and corrects an error to decode the data signal. Further, receiver 203 selects a pair of users for data transmission according to each transmission time interval (TTI), based on measurements of a channel quality of each user. Received signal y in receiver 204 may be expressed by the following equation using transmission symbol $s^{(k)} = [s_{J_1} s_{J_2} \ldots s_{J_M}]^T$ of selected (paired) users $J_1$ to $J_M$ and channel matrix $H^{(k)} = [h_{J_1} h_{J_2} \ldots h_{J_M}]$:

$$y = H^{(k)} s^{(k)} + n \tag{1}$$

Where, n is a noise vector.

Figure 2:
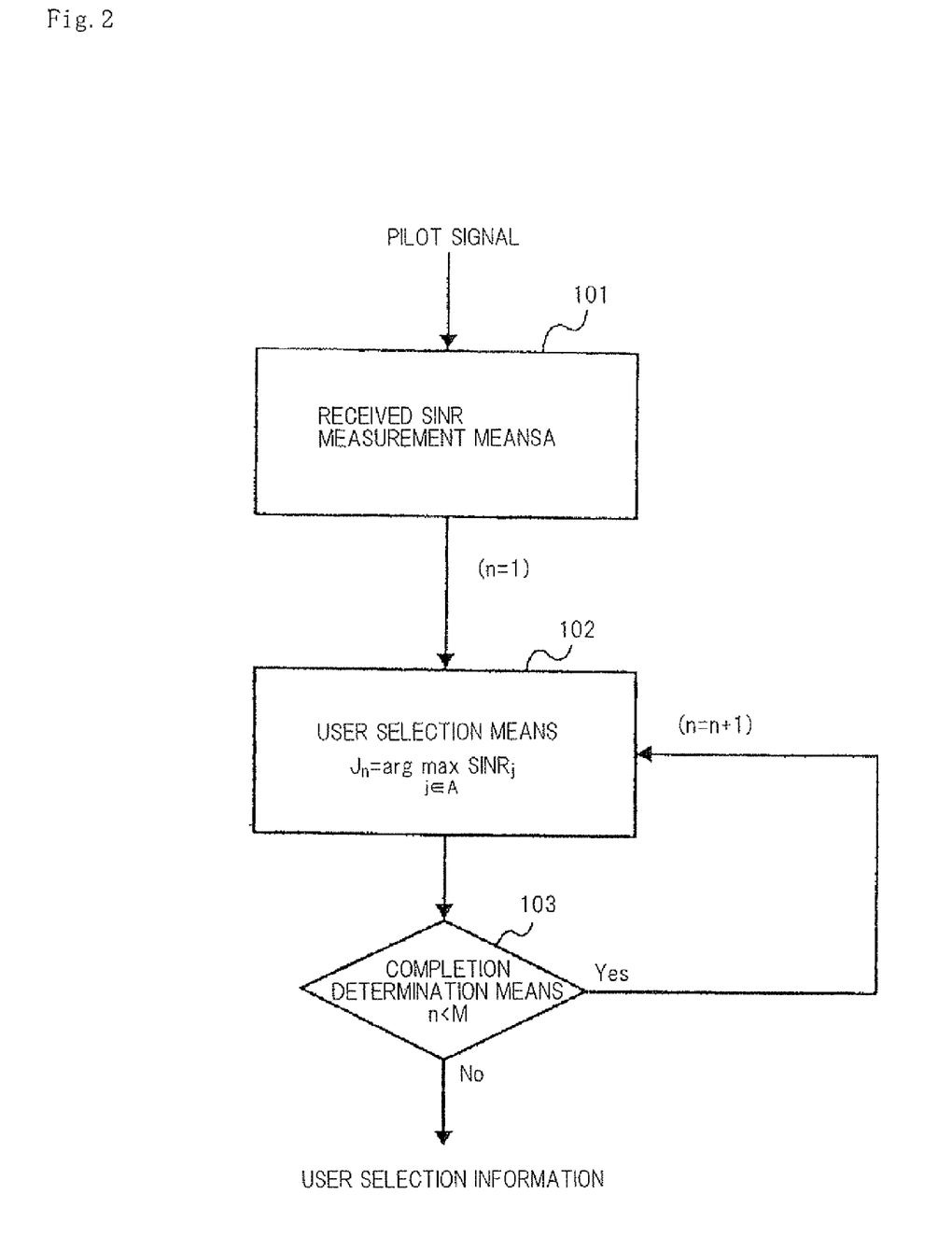
FIG. 2 shows a user selection method by a maximum CIR method.

There is a method based on a received signal to interference plus noise ratio (SINR) of each user as a user selection method of the related art. FIG. 2 shows a configuration of a device for user selection by a maximum CIR method. An example shown in FIG. 2 includes received SINR measurement means 101, user selection means 102 and completion determination means 103, and selects a user who has a large received SINR according to each TTI. Received SINR measurement means 101 measures the received SINR in up-link by using the pilot signal of each user (mainly the pilot signal for sounding periodically transmitted during non-transmission of data) the received SINR is generally used as an indicator representing channel quality, CQI (Channel Quality Indicator) in mobile communication systems. Thus, CQI may be used for the received SINR. User selection means 102 selects a user having a large received SINR. Taking a set of all users as $A = \{1, 2, \ldots, N_u\}$ ($N_u$ is the number of all the users), and the received SINR of a user j ($1 \leq j \leq N_u$) as $SINR_j$, user $J_n$ to be selected in an n-th ($1 \leq n \leq M$) MIMO multiplexed layer is selected by using the following equation.

$$J_n = \underset{j \in A}{\mathrm{argmax}} \, SINR_j \tag{2}$$

Further, selected user $J_n$ is deleted from a set of users to be selected in the next MIMO multiplexed layer by using $A = A - \{J_n\}$.

Completion determination means 103 outputs user selection information after completing the selection of users based on the number M which represents the number of simultaneous transmission users, and moves to a process of a next user selection when n<M.

Figure 3:
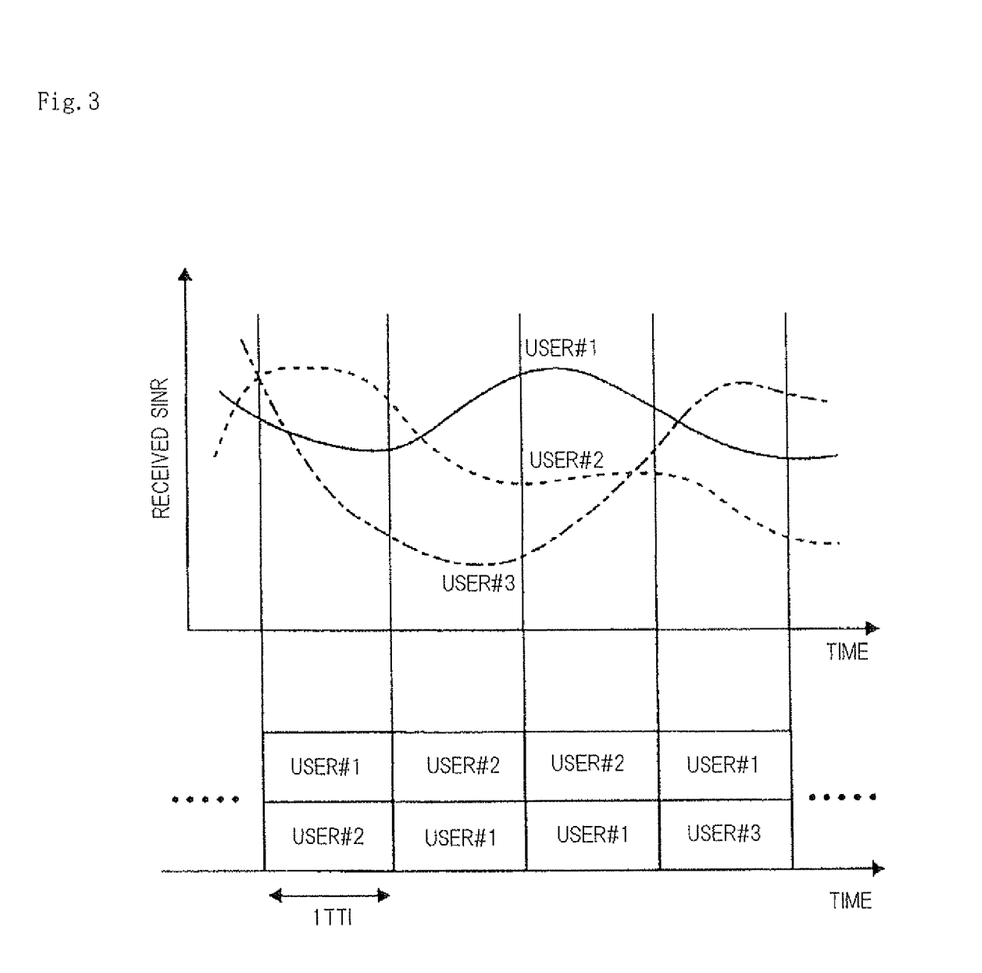
FIG. 3 shows situations of user selection by the maximum CIR method.

FIG. 3 shows situations of user selection by using a maximum CIR method when M=2. Users having the first and second largest received SINRs are selected according to each TTI, and their user transmitters are enabled to transmit data.

Figure 4:
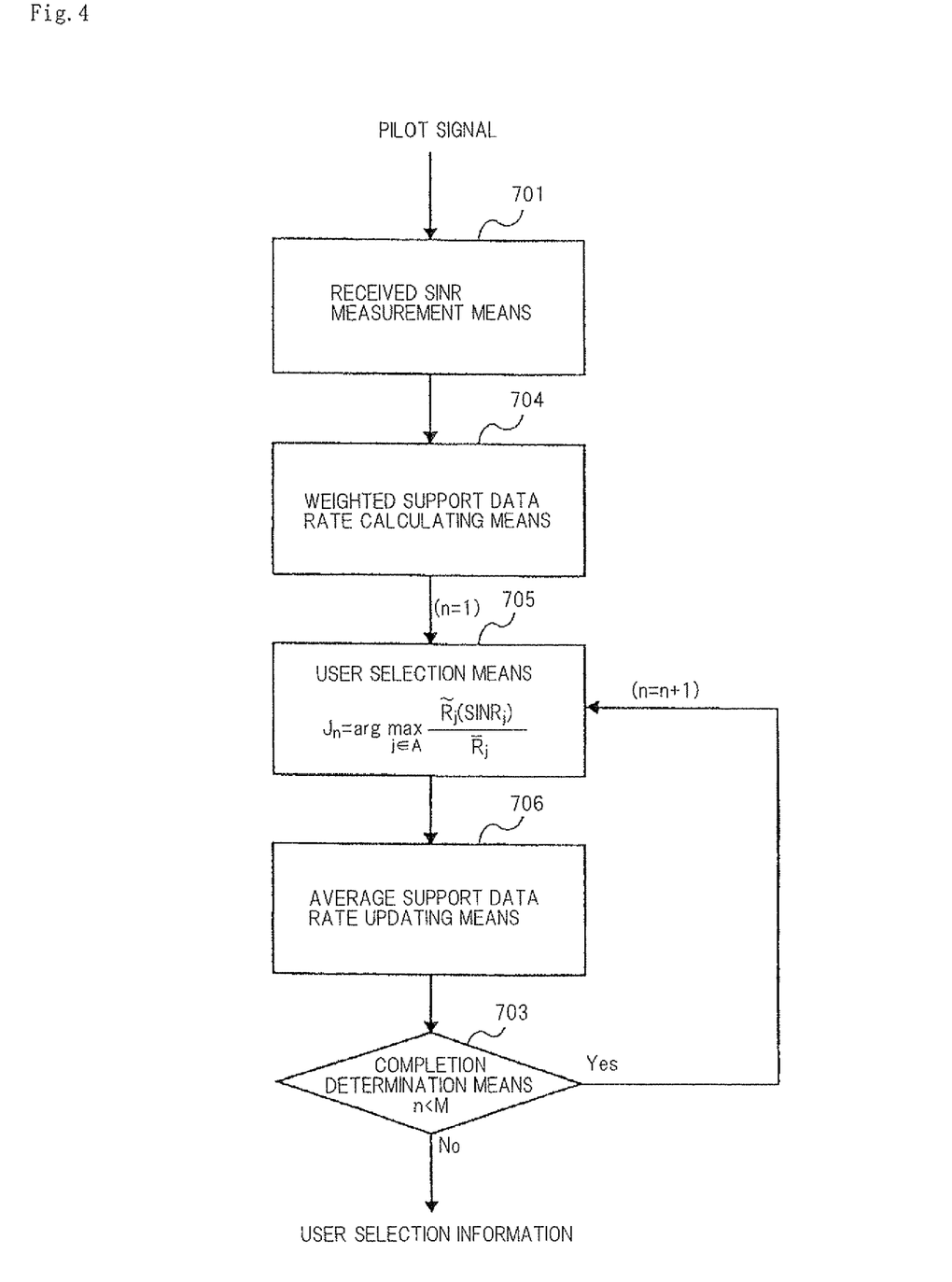
FIG. 4 shows a user selection method by a PF method.

FIG. 4 shows a configuration of a device for user selection according to a proportional fairness (PF) method. The user selection method according to the maximum CIR method can achieve the multiuser diversity effect to the maximum extent by selecting a user having a good channel quality, but does not provide fair distribution (data transmission opportunity) of the selection frequency to each user. The PF method is a user selection method for making the data transmission opportunity of each user fair.

An example shown in FIG. 4 includes received SINR measurement means 701, weighted support data rate calculating means 704, user selection means 705, average support data rate updating means 706, and completion determination means 703, and this example shows a method for selecting a user having a large support data rate weighted by the reciprocal number of an average support data rate according to each TTI. Received SINR measurement means 701 measures a received SINR in up-link by using the pilot signal of each user. Weighted support data rate calculating means 704 calculates support data rate $\tilde{R}_j(SINR_j)$ from the received SINR of each user, and calculates value $\tilde{R}_j(SINR_j)/\overline{R}_j$ weighted by the reciprocal number of the average support data rate $\overline{R}_j$.

To calculate $\tilde{R}_j(SINR_j)$, there may be a method for referring to a table for SINR versus support data rate characteristics in an adaptive white Gaussian noise (AWGN) environment acquired in advance. That is, to indicate a SINR threshold value for realizing a required block error rate of modulation and coding scheme $MCS_i$ by $Y_i$, a support data rate of $MCS_i$ is selected in $Y_i \leq SINR < Y_{i+1}$. User selection means 105 selects a user having the support data rate as large as possible, weighted by the reciprocal number of an average support data rate. User $J_n$ to be selected in an n-th MIMO multiplexed layer is selected by using the following equation.

$$J_n = \underset{j \in A}{\mathrm{argmax}} \, \frac{\tilde{R}_j(SINR_j)}{\overline{R}_j} \tag{3}$$

Further, selected user $J_n$ is deleted from a set of users to be selected in the next MIMO multiplexed layer. Average support data rate updating means 106 updates the average support data rate $\overline{R}_j$ by using the support data rate $R_{J_n}$ actually transmitted.

$$\overline{R}_j = \begin{cases} \left(1 - \frac{1}{t_c}\right)\overline{R}_j + \frac{1}{t_c}R_{J_n} & (j = J_n) \\ \left(1 - \frac{1}{t_c}\right)\overline{R}_j & (j \neq J_n) \end{cases} \quad (4)$$

where, $t_c$ is a mean time of $\overline{R}_j$. Completion determination means 703 outputs user selection information after completing the selection of users by number M of simultaneous transmission users, and moves to a process of a next user selection when n<M.

The user selection method performed in each device shown in FIGS. 2 and 4, respectively, selects a user based on the received SINR of each user, but the user selection of MU-MIMO is affected not only by the received SINR, but by channel orthogonality of the pair of users.

Figure 5:
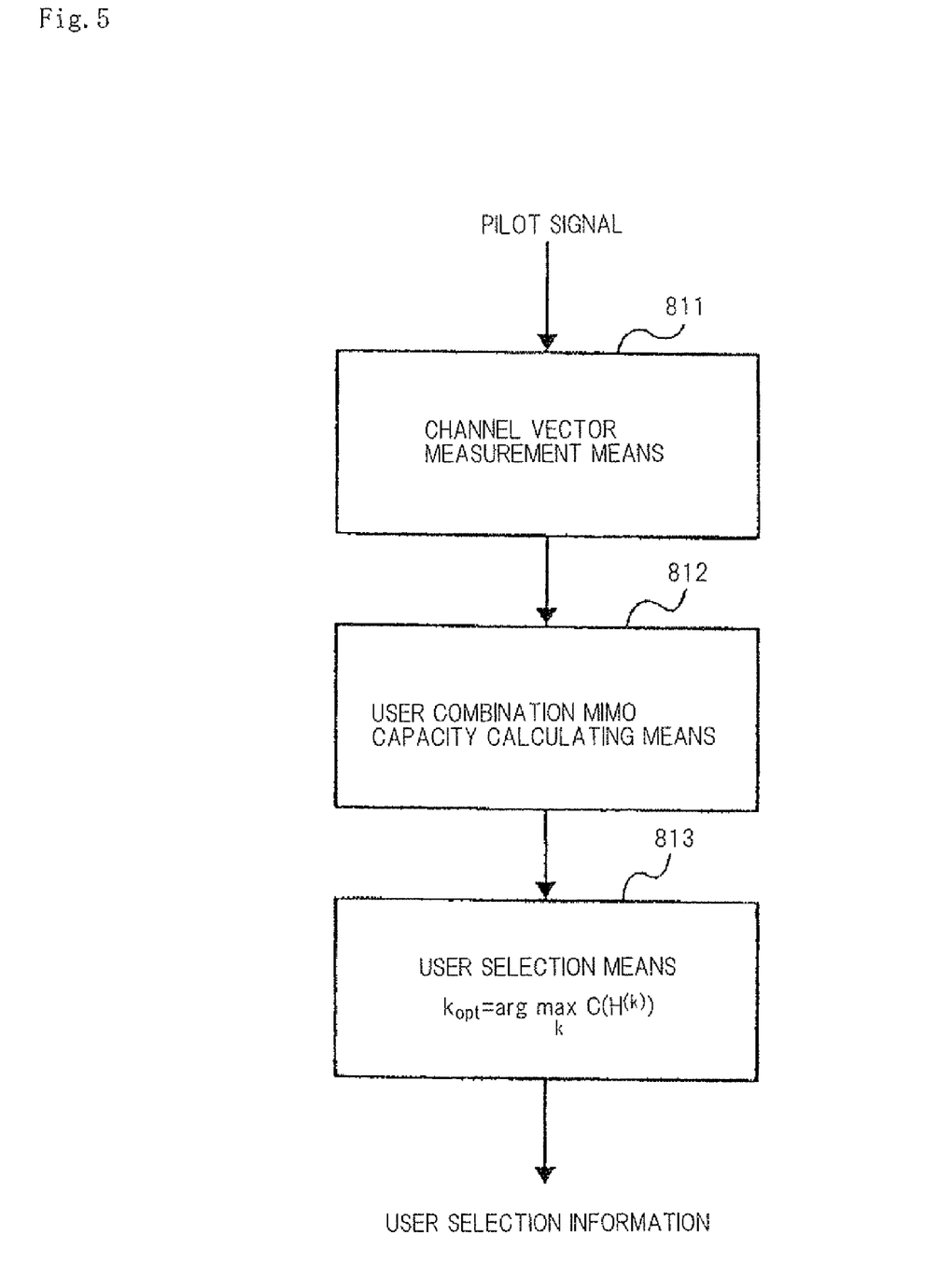
FIG. 5 shows a user selection method by a whole search method.

FIG. 5 shows a configuration of a device for user selection by a whole search method in which the channel orthogonality is considered. The user selection by the device shown in FIG. 5 includes channel vector measurement means 811, user combination MIMO capacity calculating means 812, and user selection means 813, calculates MIMO capacity of a combination of all users, and selects a combination of users having the largest capacity.

Channel vector measurement means 811 measures a channel vector in up-link by using a pilot signal of each user (mainly the pilot signal for sounding periodically transmitted during non-transmission of data). User combination MIMO capacity calculating means 812 calculates the MIMO capacity of a combination of all users. The combination number of all users is $N_{all} = {}_{N_u}C_M$, and taking a channel matrix in a combination k (k=1, 2, ..., $N_{all}$) of users as $H^{(k)}$, the MIMO capacity may be expressed by the following equation.

$$C(H^{(k)}) = \log_2 \det\left(I + \frac{P_s}{P_n}H^{(k)}H^{(k)H}\right) \quad (5)$$

$$\approx M\log_2 \frac{P_s}{P_n} + \log_2 \det(H^{(k)}H^{(k)H})$$

Where, $P_s$ is transmission power per user, and $P_n$ is noise power. User selection means 113 selects combination $k_{opt}$ of users having the largest MIMO capacity $C(H^{(k)})$.

$$k_{opt} = \arg\max_k C(H^{(k)}) \quad (6)$$

The user selection method by the whole search method has to calculate MIMO capacity $C(H^{(k)})$ in $N_{all}$ ways, and the amount of calculation becomes massive as number $N_u$ of all users and number M of simultaneous transmission users (=the number of receiving antennas) are increased.

Figure 6:
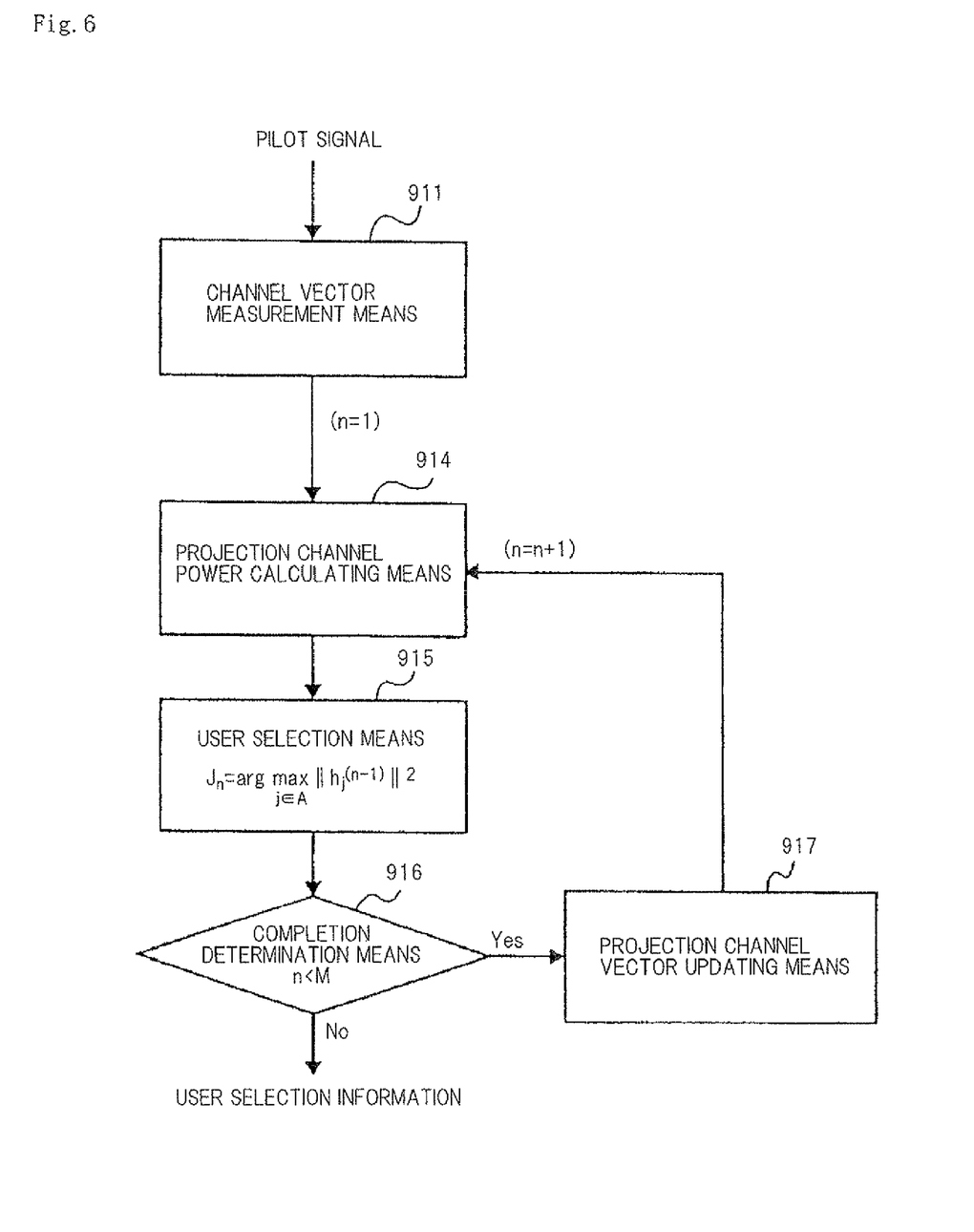
FIG. 6 shows a user selection method by a GS orthogonalization method.

FIG. 6 shows a configuration of a device for user selection by a Gram-Schmidt (GS) orthogonalization method in which the channel orthogonality is considered.

The user selection by the GS orthogonalization method performed in the device shown in FIG. 6 includes channel vector measurement means 911, projection channel power calculating means 914, user selection means 915, completion determination means 916, and projection channel vector updating means 917, and is a method for selecting a user having a large power of a projection channel vector of each user acquired by using GS orthogonalization for each MIMO multiplexed layer by each TTI, and the method is disclosed in, for example, "Multiuser diversity for a dirty paper approach" by Z. Tu and R. S. Blum, IEEE Commun. Lett., vol. 7, no. 8, pp. 370 to 372, August 2003 (Non-Patent Document 1). QR decomposition ($H^{(k)} = Q^{(k)}R^{(k)}$) is applied to channel matrix $H^{(k)}$ in equation (5), and combination $k_{opt}$ of users having the largest MIMO capacity may be expressed by the following equation.

$$k_{opt} = \arg\max_k |\det(R^{(k)})|^2 = \arg\max_k \prod_{m=1}^{M} r_{mm}^{(k)2} \quad (7)$$

Figure 7:
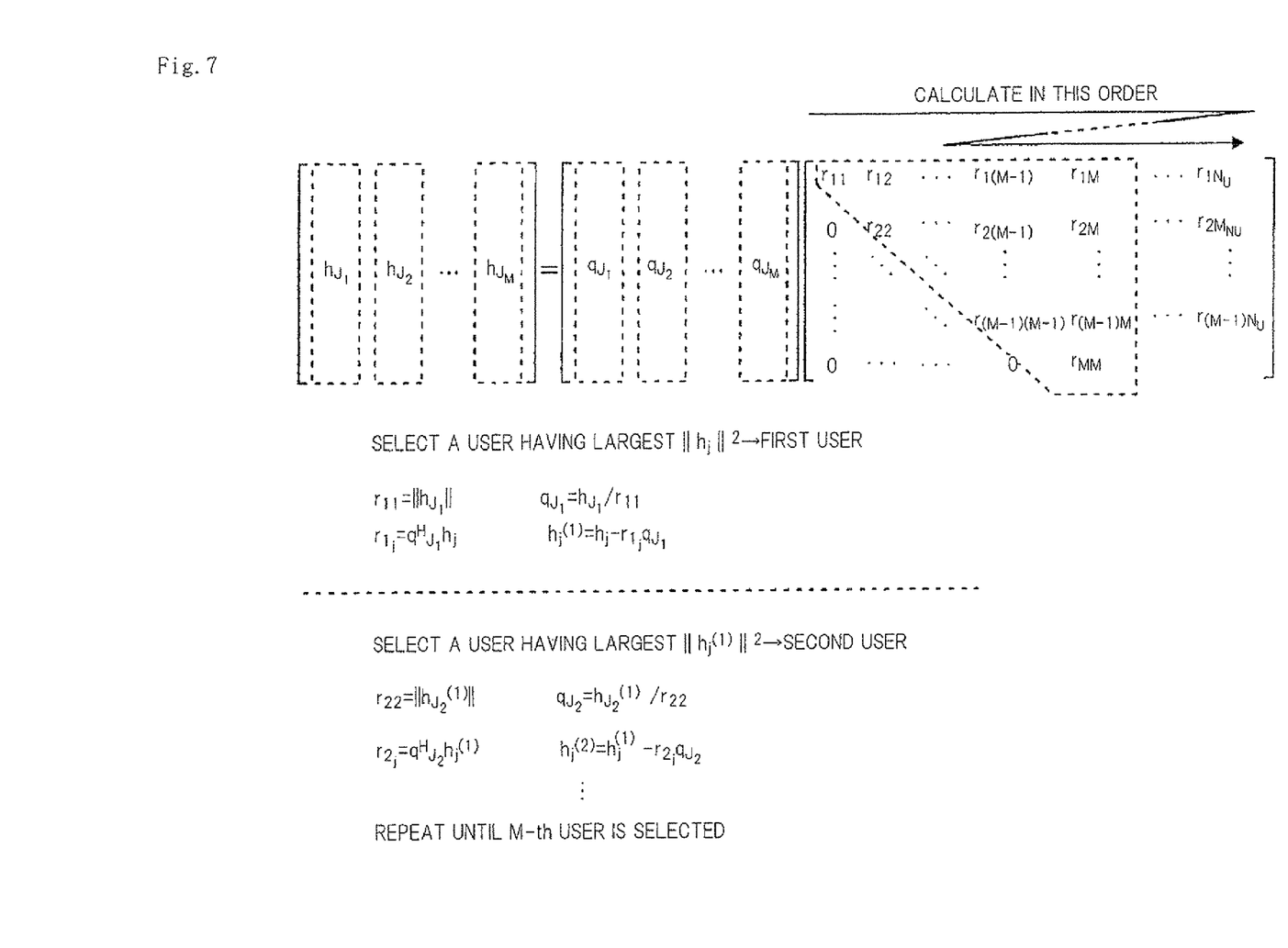
FIG. 7 shows processes of GS orthogonalization and QR decomposition.
Figure 8:
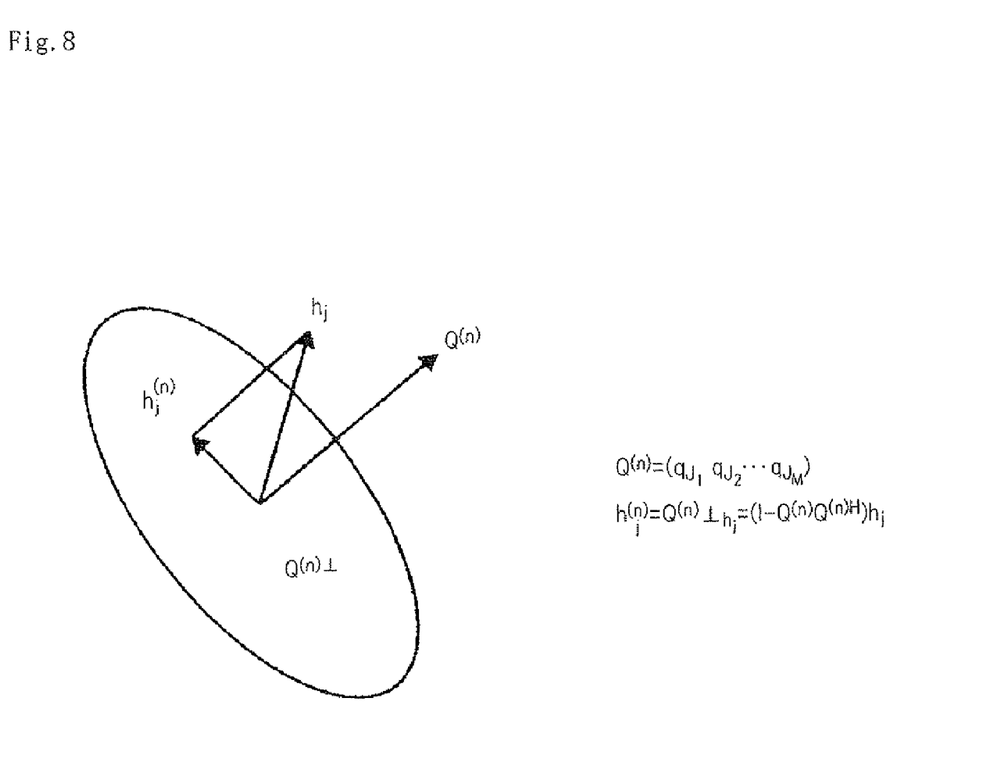
FIG. 8 shows a concept of the GS orthogonalization.

Where, $r_{mm}^{(k)}$ represents a diagonal element of $R^{(k)}$, and the MIMO capacity can be maximized when a user is selected so that the square product of $r_{mm}^{(k)}$ is maximized. To realize this quasi-optimally, the GS orthogonalization is used. The GS orthogonalization corresponds to a process in which the QR decomposition is performed while selecting a user in sequence so that $r_{mm}^{(k)}$ becomes largest. FIG. 7 shows processes of the GS orthogonalization and the QR decomposition. The process of the GS orthogonalization ends after an M-th user is selected from among the $N_u$ users. Further, FIG. 8 shows a concept of the GS orthogonalization. In the GS orthogonalization, while an orthogonal axis corresponding to a user which can project channel vector $h_j$ of a user j as largely as possible is selected in sequence, a process for updating projection channel vector $h_j^{(n)}$ of $h_j$ projected onto complementary space $Q^{(n)\perp}$ of orthonormal system $Q^{(n)}$ composed of n orthogonal axes already selected is repeated.

Channel vector measurement means 911 measures a channel vector in up-link by using a pilot signal of each user. Projection channel power calculating means 914 calculates power of projection channel vector $h_j^{(n-1)}$ of a user j updated by using the GS orthogonalization. Here, when n=1, $h_j^{(0)} = h_j$. User selection means 915 selects a user having the largest projection channel power of each user. User $J_n$ to be selected in an n-th MIMO multiplexed layer is selected by using the following equation.

$$J_n = \arg\max_{j \in A} \|h_j^{(n-1)}\|^2 \quad (8)$$

Further, selected user $J_n$ is deleted from a set of users to be selected in a next MIMO multiplexed layer. Completion determination means 916 outputs user selection information after completing the selection of users by number M of simultaneous transmission users, and moves to a process for a next user selection when n<M. Projection channel vector updating means 917 updates projection channel vector $h_j^{(n)}$ of the user j onto complementary space $Q^{(n)\perp}$ of orthonormal system $Q^{(n)}$ corresponding to the user already selected by using the GS orthogonalization.

$$h_j^{(n)} = h_j^{(n-1)} - \frac{(h_{J_n}^{(n-1)H} h_j^{(n-1)}) h_{J_n}^{(n-1)}}{\|h_{J_n}^{(n-1)}\|^2} \quad (9)$$

As described above, the user selection methods based on the received SINR (the maximum CIR method and the PF method) have a problem that the multiuser diversity effect cannot be satisfactorily provided because the channel orthogonality of a pair of users is not considered.

The user selection method by the whole search method can provide a satisfactory multiuser diversity effect, but has a problem that the amount of calculation becomes massive as the number of all users and the number of simultaneous transmission users are increased.

The user selection method by the GS orthogonalization method has a problem that interference power is not considered because of a signal power criterion based on the projection channel power of each user. It may be conceived that the interference power of each user differs in measurement at a frequency and a different time.

Further, the user selection method by the GS orthogonalization method is a user selection method according to the maximum capacity criterion, that is, the method is a channel aware (CA) method (the CA method may correspond to the conventional, maximum CIR method, which is here called "CA method" because the channel orthogonality in addition to CIR is considered in MU-MIMO), and is not disclosed about application to the user selection method by the PF method or a user selection method in which priorities (a delay request, a retransmission request, and the like) except the channel quality are considered.

SUMMARY OF THE INVENTION

An object of the present invention is to provide a user selection method and a device which can provide a satisfactory, multiuser diversity effect with a small amount of calculation.

A user selection method of the present invention is a user selection method for multiuser MIMO communication, including:

calculating an orthogonal coefficient by using a channel vector of each user and a projection channel vector updated after a previous user selection, calculating a correction SINR by using the received SINR and the orthogonal coefficient, selecting a user by using the correction SINR, and updating the projection channel vector by using GS orthogonalization for a next user selection, wherein the above processes are applied to all users.

A user selection device of the present invention is a user selection device for multiuser MIMO communication, including:

a received SINR/channel vector measurement means for measuring a received SINR and a channel vector of each user by using a pilot signal, an orthogonal coefficient calculating means for calculating an orthogonal coefficient by using a channel vector of each user and a projection channel vector updated after a previous user selection, a correction SINR calculating means for calculating a correction SINR by using a received SINR and the orthogonal coefficient calculated by the orthogonal coefficient calculating means, a user selection means for selecting a user based on the correction SINR, and a projection channel vector updating means for updating the projection channel vector by using GS orthogonalization in order to select a next user.

In the present invention configured as described above, at the time of user selection in the multiuser MIMO communication, the orthogonal coefficient is calculated from the projection channel vector updated by using the GS orthogonalization, and the received SINR is corrected with the orthogonal coefficient, and using this correction SINR, user selection is performed, and further for a next user selection, the projection channel vector is updated.

In the present invention, the received SINR is corrected with the orthogonal coefficient calculated based on the GS orthogonalization for each MIMO multiplexed layer, and using this correction SINR, a user is selected in sequence, and thereby a large, multiuser diversity effect can be provided with a small amount of calculation.

EXEMPLARY EMBODIMENTS

Next, exemplary embodiments of the present invention will be described with reference to the accompanying drawings.

Figure 9:
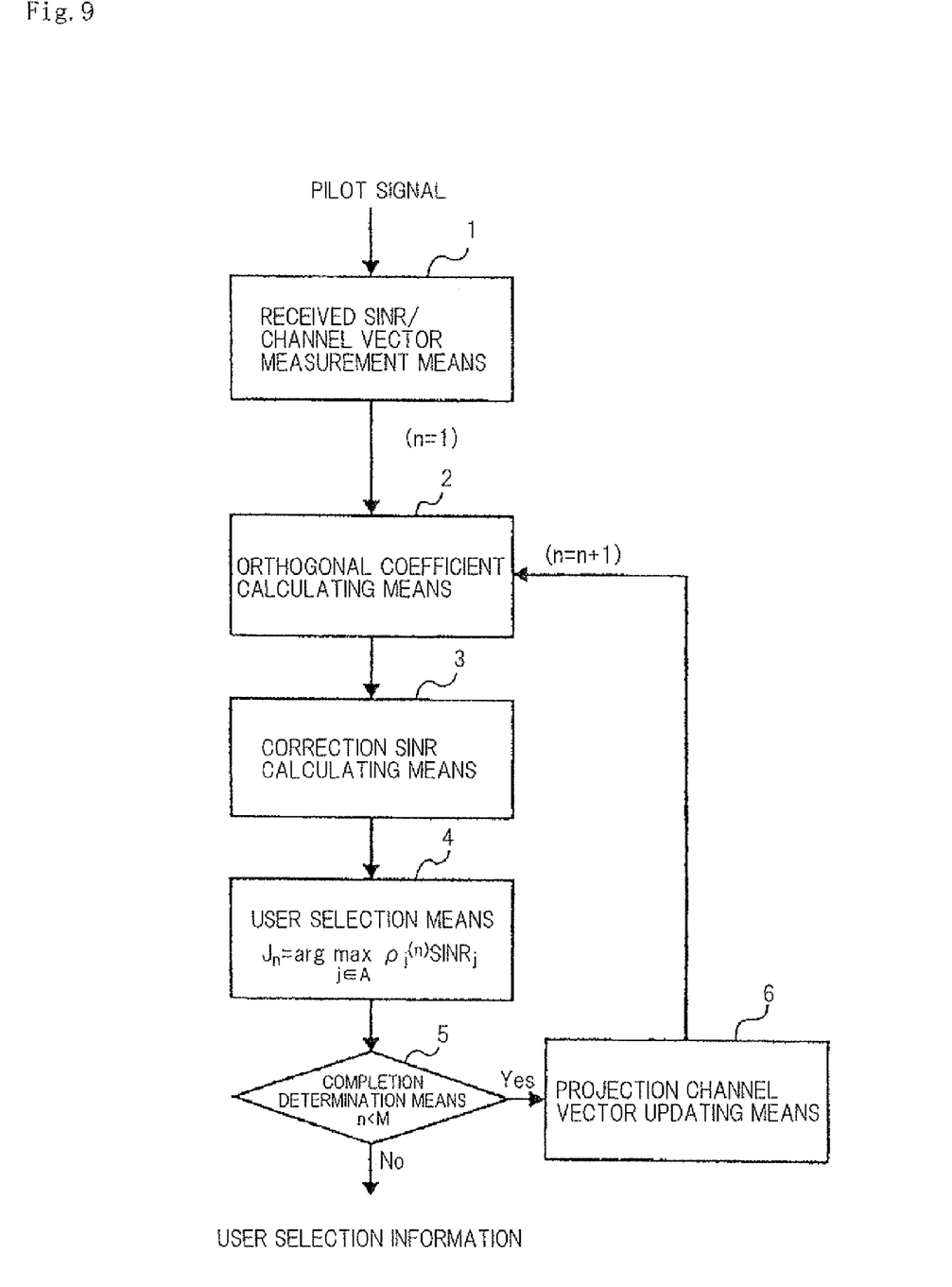
FIG. 9 shows a user selection method by a CA method of the present invention.

FIG. 9 shows a configuration of one exemplary embodiment of a device for user selection by a CA method of the present invention.

The user selection in the present exemplary embodiment is executed by using received SINR/channel vector measurement means 1, orthogonal coefficient calculating means 2, correction SINR calculating means 3, user selection means 4, completion determination means 5, and projection vector updating means 6. The user selection method is a method that a received SINR is corrected with an orthogonal coefficient calculated based on GS orthogonalization for each MIMO multiplexed layer by each TTI, and a user having a large correction SINR is selected.

Received SINR/channel vector measurement means 1 measures the received SINR and a channel vector in up-link by using a pilot signal of each user (mainly the pilot signal for sounding periodically transmitted during non-transmission of data). For an indicator representing a channel quality, CQI (Channel Quality Indicator) in mobile communication systems, the received SINR is generally used. Thus, CQI may be used for the received SINR. Orthogonal coefficient calculating means 2 averages (or totalizes) power of projection channel vector $h_j^{(n-1)}(k)$ of a subcarrier k ($1 \leq k \leq K$: K is the average number of subcarriers) of a user j updated by using the GS orthogonalization over a predetermined frequency bandwidth (a unit bandwidth measuring the received SINR, or a bandwidth of a single carrier signal), normalizes it with an average (or totalized) channel power in the same bandwidth to calculate orthogonal coefficient $\rho_j^{(n)}$ ($0 \leq \rho_j^{(n)} \leq 1$). Orthogonal coefficient $\rho_j^{(n)}$ in an n-th MIMO multiplexed layer of the user j may be expressed by the following equation.

$$\rho_j^{(n)} = \frac{\frac{1}{K}\sum_{k=1}^{K}\|h_j^{(n-1)}(k)\|^2}{\frac{1}{K}\sum_{k=1}^{K}\|h_j(k)\|^2} \quad (10)$$

Where, when n=1, $h_j^{(0)}(k)=h_j(k)$. Correction SINR calculating means 3 multiplies the received SINR of the user j, SINR$_j$ by orthogonal coefficient $\rho_j^{(n)}$ to calculate the correction SINR. User selection means 4 selects a user having a large correction SINR. Taking a set of all users as A={1, 2, . . . , N$_u$}, the correction SINR of a user j as $\rho_j^{(n)}$SINR$_j$, user J$_n$ to be selected in an n-th MIMO multiplexed layer is selected by using the following equation.

$$J_n = \underset{j \in A}{\mathrm{argmax}}\, \rho_j^{(n)} SINR_j \quad (11)$$

Further, selected user J$_n$ is deleted from a set of users to be selected in a next MIMO multiplexed layer. Completion determination means 5 outputs user selection information after completing the selection of users by number M of simultaneous transmission users, and moves to a process of a next user selection when n<M. Projection channel vector updating means 6 updates projection channel vector $h_j^{(n)}(k)$ of the user onto complementary space $Q^{(n)\perp}$ of orthonormal system $Q^{(n)}$ corresponding to the user already selected by using the GS orthogonalization.

$$h_j^{(n)}(k) = h_j^{(n-1)}(k) - \frac{(h_{J_n}^{(n-1)H}(k)h_j^{(n-1)}(k))h_{J_n}^{(n-1)}(k)}{\|h_{J_n}^{(n-1)}(k)\|^2} \quad (12)$$

In present exemplary embodiment, it is supposed that projection channel vector updating means 6 is executed for each subcarrier, but it may be executed for each subcarrier group corresponding to a coherent bandwidth to reduce the amount of calculation.

Figure 10:
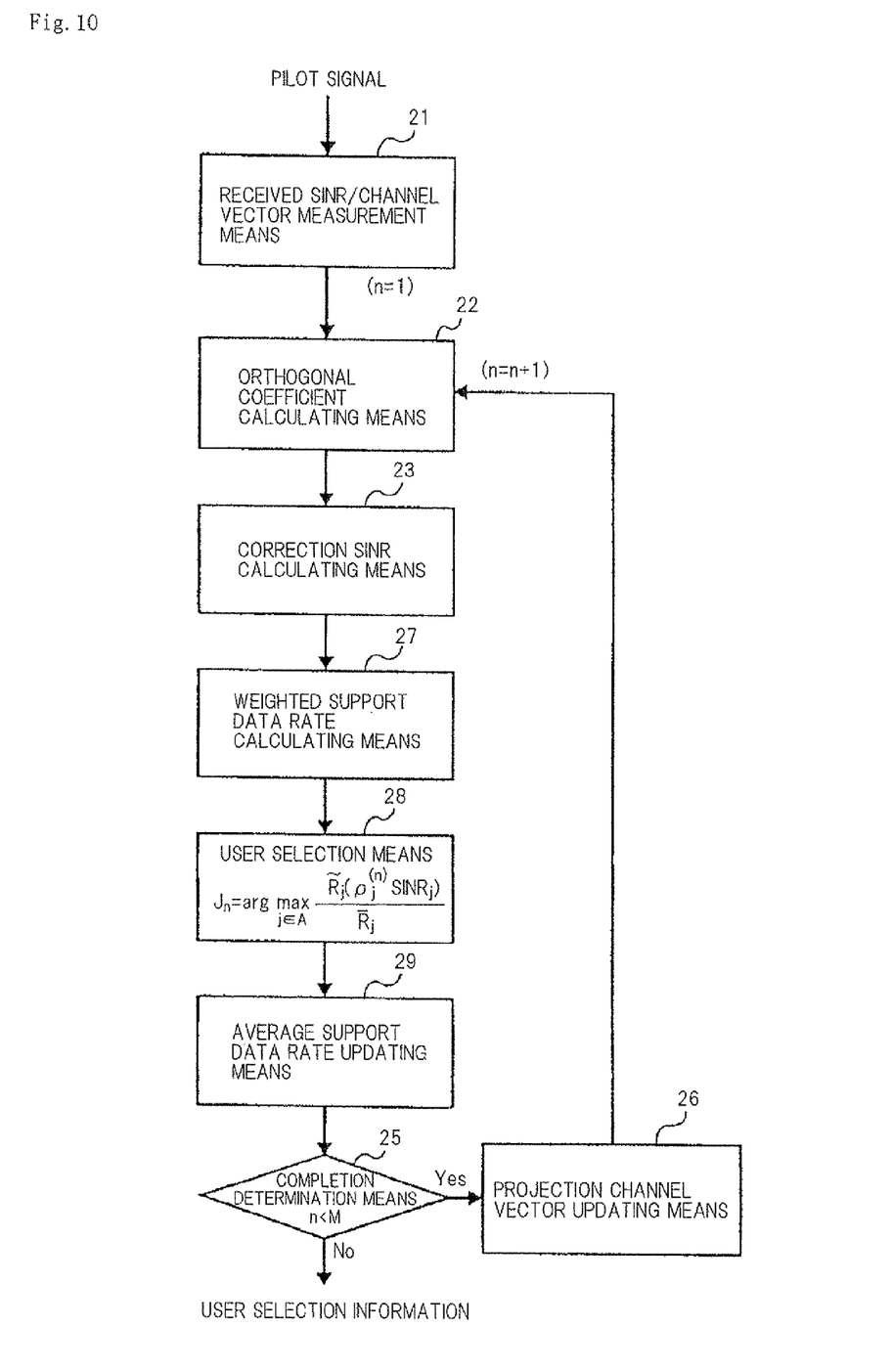
FIG. 10 shows a user selection method by a PF method of the present invention.

FIG. 10 shows a configuration of an exemplary embodiment of a device for user selection by using a PF method of the present invention.

The user selection in the present exemplary embodiment is executed by using received SINR/channel vector measurement means 21, orthogonal coefficient calculating means 22, correction SINR calculating means 23, weighted support data rate calculating means 27, user selection means 28, average support data rate updating means 29, completion determination means 25, and projection channel vector updating means 26.

A received SINR is corrected with an orthogonal coefficient calculated based on the GS orthogonalization for each MIMO multiplexed layer by each TTI, and a support data rate is calculated from this correction SINR, and a user is selected who has a large support data rate weighted by the reciprocal number of an average support data rate.

Received SINR/channel vector measurement 21 measures the received SINR and a channel vector in up-link by using a pilot signal of each user. Orthogonal coefficient calculating means 22 averages (or totalizes) power of projection channel vector $h_j^{(n-1)}(k)$ of a subcarrier k of a user j updated by using the GS orthogonalization over a predetermined signal bandwidth (a unit bandwidth for measuring the received SINR, or a bandwidth of a single carrier signal), normalizes it with an average (or totalized) channel power to calculate orthogonal coefficient $\rho_j^{(n)}$ ($0 \leq \rho_j^{(n)} \leq 1$) according to equation (11).

Correction SINR calculating means 23 multiplies the received SINR of the user j, SINR$_j$ by orthogonal coefficient $\rho_j^{(n)}$ to calculate the correction SINR. Weighted support data rate calculating means 27 calculates support data rate $\tilde{R}_j(\rho_j^{(n)}$SINR$_j)$ from the correction SINR of each user, and calculates value $\tilde{R}_j(\rho_j^{(n)}$SINR$_j)/\bar{R}_j$ weighted by the reciprocal number of average support data rate $\bar{R}_j$.

To calculate $\tilde{R}_j(\rho_j^{(n)}$SINR$_j)$, there may be a method to refer a table for SINR versus support data rate characteristics in an adaptive white Gaussian noise (AWGN) environment acquired in advance. That is, indicating an SINR threshold value for realizing a required block error rate of modulation and coding scheme MCS$_i$ by Y$_i$, a support data rate of MCS$_i$ is selected in Y$_i \leq$ SINR $<$ Y$_{i+1}$. User selection means 28 selects a user having the support data rate as large as possible, weighted by the reciprocal number of the average support data rate.

User J$_n$ to be selected in an n-th MIMO multiplexed layer is selected by using the following equation.

$$J_n = \underset{j \in A}{\mathrm{argmax}}\, \frac{\tilde{R}_j(\rho_j^{(n)} SINR_j)}{\bar{R}_j} \quad (13)$$

Further, selected user J$_n$ is deleted from a set of users to be selected in a next MIMO multiplexed layer. Average support data rate updating means 29 updates average support data rate $\bar{R}_j$ according to equation (4) by using support data rate $R_{J_n}$ actually transmitted. Completion determination means 25 outputs user selection information after completing the selection of users by number M of simultaneous transmission users, and moves to a process of a next user selection when n<M. Projection channel vector updating means 26 updates projection channel vector $h_j^{(n)}(k)$ of the user j onto complementary space $Q^{(n)\perp}$ of orthonormal system $Q^{(n)}$ corresponding to the user already selected by using the GS orthogonalization according to equation (12).

In the exemplary embodiments shown in FIGS. 9 and 10, respectively, it is supposed that a series of processes composed of projection channel vector updating means 6, 26, orthogonal coefficient calculating means 2, 22, correction SINR calculating means 3, 23 is executed by number N$_u$ of all users, but a method may be thought of that, on user selection in a first MIMO multiplexed layer, multiple users having a higher priority are selected, and only from among these users, user selection in an MIMO multiplexed layer on and after a second user selection is executed. Accordingly, the amount of calculation can be largely reduced. It is because if more than a few (for example, 16) users having a higher priority are considered, there is a pair of users having high orthogonality among them, and consequently it may be thought that it is unlikely to select a user having a lower priority only based on an effect of the channel orthogonality.

Application to a user selection method in which priorities (a delay request, a retransmission request, and the like) except the channel quality are considered may be realized if user selection is executed based on an overall priority in which the priorities except the channel priority are added to a priority expressed by a function of the correction SINR. A user selected based on the overall priority is subjected to the GS orthogonalization.

Figure 11:
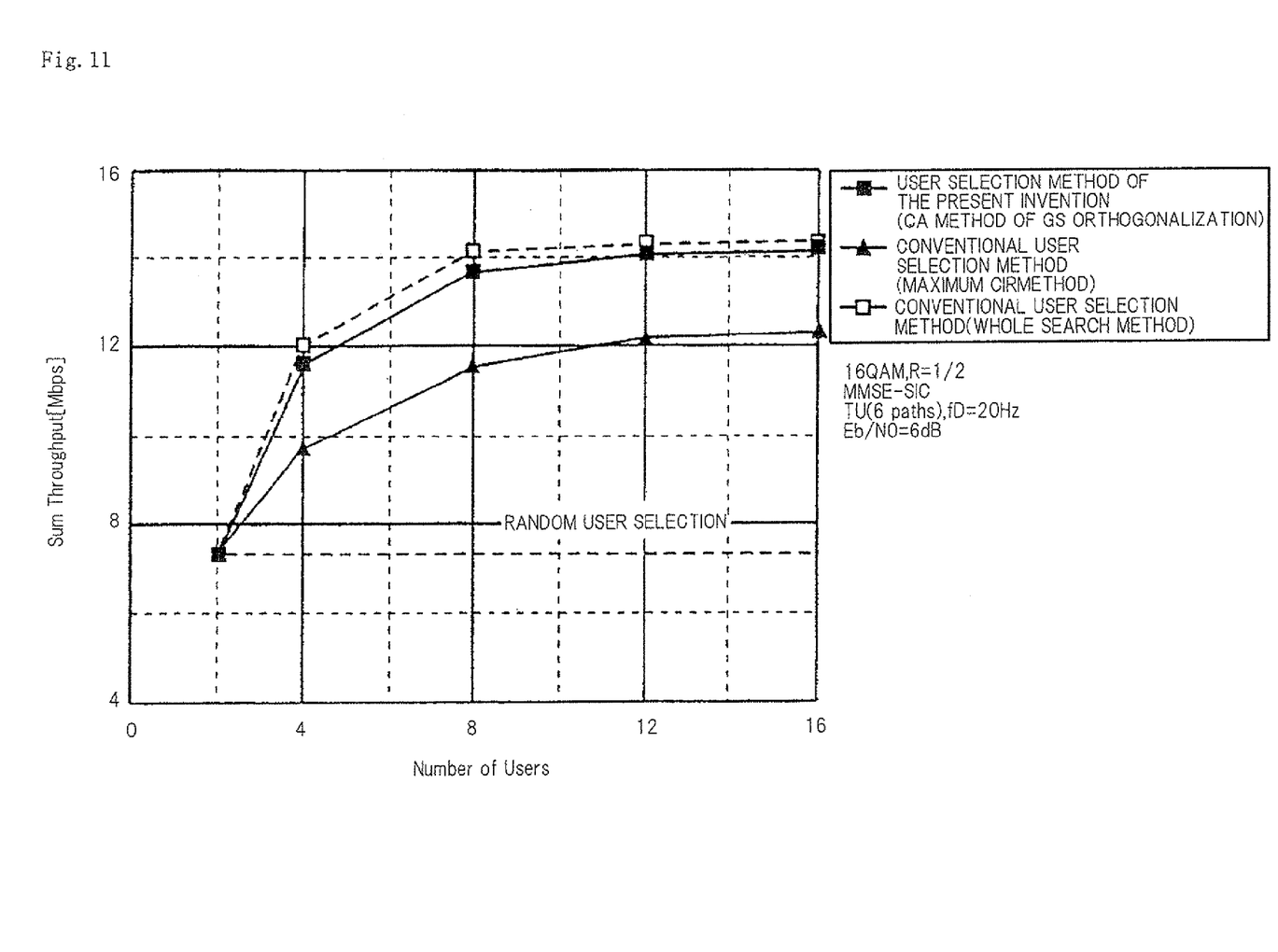
FIG. 11 shows throughput characteristics of the user selection method of the present invention.

FIG. 11 shows throughput characteristics of the user selection method by the CA method of the present invention. For a receiving scheme, a minimum mean square error method and a serial interference canceller (MMSE-SIC) were used. In the user selection method of the present invention, as the number of users increases, throughput is largely improved because of the multiuser diversity effect, and the throughput at 16 users is about twice compared to that of a random user selection, and can be improved by about 15% compared to the conventional maximum CIR method in which the channel orthogonality is not considered. Further, the throughput equivalent to that of the conventional whole search method can be provided with a smaller amount of calculation.

As described above, in the user selection methods of the present invention, the received SINR is corrected with the orthogonal coefficient calculated based on the GS orthogonalization for each MIMO multiplexed layer, and using this correction SINR, a user is selected in sequence, and thereby a large, multiuser diversity effect can be provided with a small amount of calculation.

In addition, the user selection method in the up-link portion of MU-MIMO systems has been described in the present exemplary embodiments, but the user selection methods of the present invention can be applied to a down-link portion of the MU-MIMO systems.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A user selection method for multiuser MIMO communication, comprising:
calculating an orthogonal coefficient by using a channel vector of each user and a projection channel vector updated after a previous user selection,
calculating a correction SINR by using the received SINR and the orthogonal coefficient,
selecting a user by using the correction SINR, and
updating the projection channel vector by using GS orthogonalization for a next user selection, wherein
the above processes are applied to all users.

2. The user selection method according to claim 1, wherein for the received SINR, CQI is used.

3. The user selection method according to claim 1, wherein in the calculation of the orthogonal coefficient, power of the projection channel vector updated by the GS orthogonalization is averaged or totalized over a predetermined frequency bandwidth, and normalized with an average or totalized channel power to calculate the orthogonal coefficient.

4. The user selection method according to claim 3, wherein the predetermined frequency bandwidth is a unit bandwidth for measuring the received SINR, or a bandwidth of a single carrier signal.

5. The user selection method according to claim 1, wherein in the calculation of the orthogonal coefficient, taking the projection channel vector of a subcarrier k ($1 \leq k \leq K$: K is the average number of subcarriers) of a user j ($1 \leq j \leq N_u$: $N_u$ is the number of all users) as $h_j^{(n-1)}(k)$, and a channel vector of the subcarrier k of the user j as $h_j(k)$, orthogonal coefficient $\rho_j^{(n)}$ ($0 \leq \rho_j^{(n)} \leq 1$) of an n-th MIMO multiplexed layer of the user j is calculated so as to meet the following equation:

$$\rho_j^{(n)} = \frac{\frac{1}{K}\sum_{k=1}^{K} \|h_j^{(n-1)}(k)\|^2}{\frac{1}{K}\sum_{k=1}^{K} \|h_j(k)\|^2}.$$

6. The user selection method according to claim 1, wherein in the correction of the received SINR, the correction SINR is calculated by multiplying the received SINR by the orthogonal coefficient.

7. The user selection method according to claim 1, wherein in the user selection, a user having a large correction SINR is selected.

8. The user selection method according to claim 1, wherein in the user selection, a support data rate is calculated from the correction SINR, and
a user having a large support data rate weighted by the reciprocal number of an average support data rate is selected.

9. The user selection method according to claim 1, wherein in the user selection, a user having a high priority expressed by a function of the correction SINR is selected.

10. The user selection method according to claim 1, wherein
in the user selection, a user is selected who has a high, overall priority in which priorities such as a delay request and a retransmission request except a channel quality are added to a priority expressed by a function of the correction SINR.

11. The user selection method according to claim 1, wherein
in the updating of the projection channel vector, the projection channel vector onto a complementary space of an orthonormal system corresponding to the user already selected by using the GS orthogonalization is updated for each predetermined frequency resolution.

12. The user selection method according to claim 11, wherein
the predetermined frequency resolution is defined as each subcarrier or each subcarrier group corresponding to a coherent bandwidth.

13. The user selection method according to claim 1, wherein
in the updating of the projection channel vector, taking the projection channel vector of a subcarrier k of a user j as $h_j^{(n-1)}(k)$, and a selected user in an n-th MIMO multiplexed layer as $J_n$, the projection channel vector of the subcarrier k of the user j in the n-th MIMO multiplexed layer is updated so as to meet the following equation:

$$h_j^{(n)}(k) = h_j^{(n-1)}(k) - \frac{(h_{J_n}^{(n-1)H}(k)h_j^{(n-1)}(k))h_{J_n}^{(n-1)}(k)}{\|h_{J_n}^{(n-1)}(k)\|^2}.$$

14. The user selection method according to claim 1, wherein
multiple users having a higher priority on user selection in a first MIMO multiplexed layer are selected, and
only from among these users, user selection in an MIMO multiplexed layer on and after a second user selection is executed.

15. A user selection device for multiuser MIMO communication, comprising:
- a received SINR/channel vector measurement means for measuring a received SINR and a channel vector of each user by using a pilot signal,
- an orthogonal coefficient calculating means for calculating an orthogonal coefficient by using a channel vector of each user and a projection channel vector updated after a previous user selection,
- a correction SINR calculating means for calculating a correction SINR by using a received SINR and the orthogonal coefficient calculated by the orthogonal coefficient calculating means,
- a user selection means for selecting a user based on the correction SINR, and
- a projection channel vector updating means for updating the projection channel vector by using GS orthogonalization in order to select a next user.

16. The user selection device according to claim 15, wherein
the received SINR/channel vector measurement means uses CQI for the received SINR.

17. The user selection device according to claim 15, wherein
the orthogonal coefficient calculating means, in calculating the orthogonal coefficient, averages or totalizes power of the projection channel vector updated by using the GS orthogonalization over a predetermined frequency bandwidth, and normalizes it with an average or totalized channel power in the same bandwidth to calculate the orthogonal coefficient.

18. The user selection device according to claim 17, wherein
the predetermined frequency bandwidth in which the orthogonal coefficient calculating means averages or totalizes the power is a unit bandwidth for measuring the received SINR, or a bandwidth of a single carrier signal.

19. The user selection device according to claim 15, wherein
the orthogonal coefficient calculating means, in calculating the orthogonal coefficient, taking the projection channel vector of a subcarrier k ($1 \leq k \leq K$: K is the average number of subcarriers) of a user j ($1 \leq j \leq N_u$: $N_u$ is the number of all users) as $h_j^{(n-1)}(k)$, and a channel vector of the subcarrier k of the user j as $h_j(k)$, calculates orthogonal coefficient $\rho_j^{(n)}$ ($0 \leq \rho_j^{(n)} \leq 1$) of an n-th MIMO multiplexed layer of the user j so as to meet the following equation:

$$\rho_j^{(n)} = \frac{\frac{1}{K}\sum_{k=1}^{K}\|h_j^{(n-1)}(k)\|^2}{\frac{1}{K}\sum_{k=1}^{K}\|h_j(k)\|^2}.$$

20. The user selection device according to claim 15, wherein
the correction SINR calculating means, in correcting the received SINR, calculates the correction SINR by multiplying the received SINR by the orthogonal coefficient.

21. The user selection device according to claim 15, wherein
the user selection means, in the user selection, selects a user having a large correction SINR.

22. The user selection device according to claim 15, further comprising:
a support data rate calculating means for calculating a support data rate from the correction SINR to calculate a support data rate weighted by the reciprocal number of an average support data rate, wherein
the user selection means, in the user selection, selects a user having a large support data rate.

23. The user selection device according to claim 15, wherein
the user selection means, in the user selection, selects a user having a high priority expressed by a function of the correction SINR.

24. The user selection device according to claim 15, wherein
the user selection means, in the user selection, selects a user having a high, overall priority in which priorities such as a delay request and a retransmission request except a channel quality are added to a priority expressed by a function of the correction SINR.

25. The user selection device according to claim 15, wherein
the projection channel vector updating means, in updating the projection channel vector, updates the projection channel vector onto a complementary space of an orthonormal system corresponding to the user already selected by using the GS orthogonalization for each predetermined frequency resolution.

26. The user selection device according to claim 25, wherein
the predetermined frequency resolution at the updating of the projection channel vector updating means is defined as each subcarrier or each subcarrier group corresponding to a coherent bandwidth.

27. The user selection device according to claim 15, wherein
the projection channel vector updating means, in updating the projection channel vector, taking the projection channel vector of a subcarrier k of a user j as $h_j^{(n-1)}(k)$ and a selected user in an n-th MIMO multiplexed layer as $J_n$, updates the projection channel vector of the subcarrier k of the user j in the n-th MIMO multiplexed layer so as to meet the following equation;

$$h_j^{(n)}(k) = h_j^{(n-1)}(k) - \frac{(h_{J_n}^{(n-1)H}(k)h_j^{(n-1)}(k))h_{J_n}^{(n-1)}(k)}{\|h_{J_n}^{(n-1)}(k)\|^2}.$$

28. The user selection device according to claim 15, wherein
the user selection means selects multiple users having a higher priority on user selection in a first MIMO multiplexed layer, and selects a user only from among these users on and after a second user selection in an MIMO multiplexed layer.

* * * * *